United States Patent
Murakata

(10) Patent No.: US 7,626,747 B2
(45) Date of Patent: Dec. 1, 2009

(54) LIQUID CRYSTAL DISPLAY APPARATUS

(75) Inventor: Masato Murakata, Hyogo (JP)

(73) Assignee: Panasonic Corporation, Osaka (JP)

(*) Notice: Subject to any disclaimer, the term of this patent is extended or adjusted under 35 U.S.C. 154(b) by 393 days.

(21) Appl. No.: 11/624,294

(22) Filed: Jan. 18, 2007

(65) Prior Publication Data
US 2007/0279728 A1 Dec. 6, 2007

(30) Foreign Application Priority Data
Jun. 2, 2006 (JP) ............... 2006-154267

(51) Int. Cl.
G02F 1/03 (2006.01)
G02F 1/1333 (2006.01)
F21V 7/04 (2006.01)

(52) U.S. Cl. ............... 359/245; 359/253; 349/58; 349/64; 349/65; 362/632

(58) Field of Classification Search ............... 359/245, 359/265–275, 247, 253; 349/61–65, 58, 349/113; 362/26, 27, 31, 560, 561, 609, 362/610, 614, 235, 294, 613, 330, 346, 327, 362/623, 632; 345/7, 58
See application file for complete search history.

(56) References Cited

U.S. PATENT DOCUMENTS 5,453,855 A * 9/1995 Nakamura et al. ............... 349/58
5,886,759 A * 3/1999 Mashino et al. ............... 349/65
6,134,092 A * 10/2000 Pelka et al. ............... 361/31
6,147,724 A * 11/2000 Yoshii et al. ............... 349/62
6,315,440 B1 * 11/2001 Satoh ............... 362/561
6,388,722 B1 * 5/2002 Yoshii et al. ............... 349/62
6,415,531 B1 * 7/2002 Ohtsuki et al. ............... 36/31
6,490,015 B1 * 12/2002 Kim ............... 349/58
6,626,550 B2 * 9/2003 Choi ............... 362/632
6,776,512 B2 * 8/2004 Mori et al. ............... 362/390
7,061,465 B2 * 6/2006 Yajima et al. ............... 345/102
7,139,046 B2 * 11/2006 Katahira ............... 349/58
7,517,135 B2 * 4/2009 Yu ............... 362/633
7,542,108 B2 * 6/2009 Saito et al. ............... 349/64

FOREIGN PATENT DOCUMENTS

JP 2001-091947 4/2001

* cited by examiner

Primary Examiner—Loha Ben
(74) Attorney, Agent, or Firm—RatnerPrestia

(57) ABSTRACT

A liquid crystal display apparatus includes an optical sheet for uniformly diffusing light toward a light-emitting face, and a resin frame onto which the optical sheet is attached. The optical sheet has the first fixing portion or the second fixing portion. The optical sheet is attached to the resin frame by fitting the first fixing portion or the second fixing portion to a concavity created at the resin frame at a part corresponding to the first fixing portion or the second fixing portion. At least one notch is created at a boundary area between a display area of the optical sheet and the first fixing portion or the second portion so that deformation in the optical sheet caused by a significant mechanical stress, such as drop impact, does not extend to the display area.

17 Claims, 11 Drawing Sheets

LIQUID CRYSTAL DISPLAY APPARATUS

BACKGROUND OF THE INVENTION

1. Field of the Invention

The present invention relates to liquid crystal display apparatuses used as display units for mobile electronic devices such as notebook PCs and PDAs, which are configured with parts and materials that are often affected by external factors such as drop impact, and more particularly to the outer shapes of optical sheets in liquid crystal display apparatuses designed to reduce display failure caused by warpage or deformation due to impact applied to the optical sheets.

2. Background Art

Liquid crystal display apparatuses are being built into a broadening range of electronic devices, particularly portable models, which are becoming ever smaller and lighter.

Liquid crystal display apparatuses are subjected to mechanical and thermal stresses during use. These stresses are often caused by external factors, typically due to dropping and their striking other objects while being carried, and use under diverse environmental conditions. Accordingly, improvement of resistance to these external factors is being demanded. Japanese Patent Unexamined Publication No. 2001-91947 discloses a technology to improve resistance to such external factors.

A conventional liquid crystal display apparatus is described below with reference to drawings.

FIG. 16A is a perspective view of a notebook PC equipped with conventional liquid crystal display apparatus 270. FIG. 16B is a sectional view of FIG. 16A at arrow 16B, and illustrates a structure of conventional liquid crystal display apparatus 270.

As shown in FIG. 16B, liquid crystal display apparatus 270 generally includes light-transmitting liquid crystal panel 271 configured with liquid crystal layer held between a pair of glass substrates and surface light-source unit 272 overlaid on the surface of liquid crystal panel 271. Liquid crystal panel 271 is placed in substantially rectangular resin frame 201. Rectangular metal bezel 273 underlaid on liquid crystal panel 271 is attached to this resin frame 201. Liquid crystal panel 271 is thus interposed and held between resin frame 201 and metal bezel 273.

Normally, surface light-source unit 272 includes light guide plate 274 and tubular light source (fluorescent tube) 275 provided at one end facing light guide plate 274. Optical sheet 202, including multiple sheets such as a diffusing sheet and a prism sheet, is provided at the light-emitting side of light guide plate 274 for controlling the light-emitting characteristic. Reflection sheet 276 is provided at light guide plate 274 at the side opposite the light-emitting face.

Light guide plate 274, optical sheet 202, reflection sheet 276, and tubular light source 275, which configure surface light-source unit 272, are attached to resin frame 201. More specifically, in liquid crystal display apparatus 270, liquid crystal panel 271, resin frame 201, optical sheet 202, light guide plate 274, and reflection sheet 276 are overlaid in this sequence from the light-emitting face. Tubular light source 275 is provided at one end of light guide plate 274, and metal bezel 273 and resin frame 201 sandwich and hold liquid crystal panel 271.

FIG. 17 is a perspective view of conventional liquid crystal display apparatus 270. Only resin frame 201, optical sheet 202, and both-sided tape 204 are illustrated in FIG. 17; no liquid crystal panel, light guide plate, reflection sheet, tubular light source, metal bezel, or driving circuit board are shown.

As shown in FIG. 17, first fixing portion 203 provided at one side of optical sheet 202 is secured onto resin frame 201 with double-sided tape 204. Second fixing portion 205 provided at the other side is not secured with double-sided tape, but fitted to concavity 206 created at resin frame 201.

FIG. 18 is a fragmentary plan view of the details around second fixing portion 205, and illustrates second fixing portion 205 of optical sheet 202 and display area 209 of optical sheet 202. Resin frame 201 and its concavity 206 are also shown. Boundary area 208 between display area 209 of optical sheet 202 and second fixing portion 205 is indicated by the two-dot chain line. As shown in FIG. 18, second fixing portion 205 and concavity 206 position optical sheet 202 onto resin frame 201. More specifically, optical sheet 202 is positioned by making positioning area 207 of second fixing portion 205 contacts the wall of concavity 206.

The operation of conventional liquid crystal display apparatus 270 as configured above is described below.

A thermal stress caused by temperature rise affects optical sheet 202, and a difference in thermal expansion occurs between optical sheet 202 and resin frame 201. Resin frame 201 and first fixing portion 203 are secured with double-sided tape 204, but resin frame 201 and second fixing portion 205 are not secured with the double-sided tape. Accordingly, second fixing portion 205 absorbs the difference in thermal expansion in a longer direction of optical sheet 202. This prevents warpage of optical sheet 202, positional deviation, and so on.

However, if a significant mechanical stress, which is an external factor such as drop impact and vibration, is applied to the conventional structure in direction X, as shown in FIG. 19, optical sheet 202 moves in direction X because concavity 206 created at resin frame 201 is used for positioning, although optical sheet 202 is mostly retained at a predetermined position. As a result, positioning area 207 of second fixing portion 205 may deform or be damaged, as shown in FIG. 19. If this deformation spreads to display area 209 via boundary area 208, display failure such as uneven brightness occurs.

SUMMARY OF THE INVENTION

A liquid crystal display apparatus of the present invention includes a light guide plate for leading light from a light source, an optical sheet for uniformly diffusing light from a light source led by a light guide plate toward a light-emitting face, and a resin frame onto which the optical sheet is attached. The first fixing portion provided at one side of the optical sheet is fitted into a concavity created at the resin frame. The second fixing portion provided at a side opposite the side on which the first fixing portion is provided is fitted into a concavity created at the resin frame at a part corresponding to the second fixing portion. This attaches the optical sheet onto the resin frame. At least one notch is created at a longer direction of the first fixing portion or the second fixing portion at a boundary area between a display area of the optical sheet and the first fixing portion or the second fixing portion.

Since the notch is created at the boundary area between the display area of the optical sheet and at least the first fixing portion or the second fixing portion, the extension of deformation of the optical sheet to the display area is preventable even if a large mechanical stress, such as drop impact, is applied. Accordingly, display failure caused by deformation of the optical sheet can be eliminated, and thus quality-images can be displayed.

DETAILED DESCRIPTION OF THE INVENTION

Embodiments of the present invention are described below with reference to drawings.

First Embodiment

Figure 1:
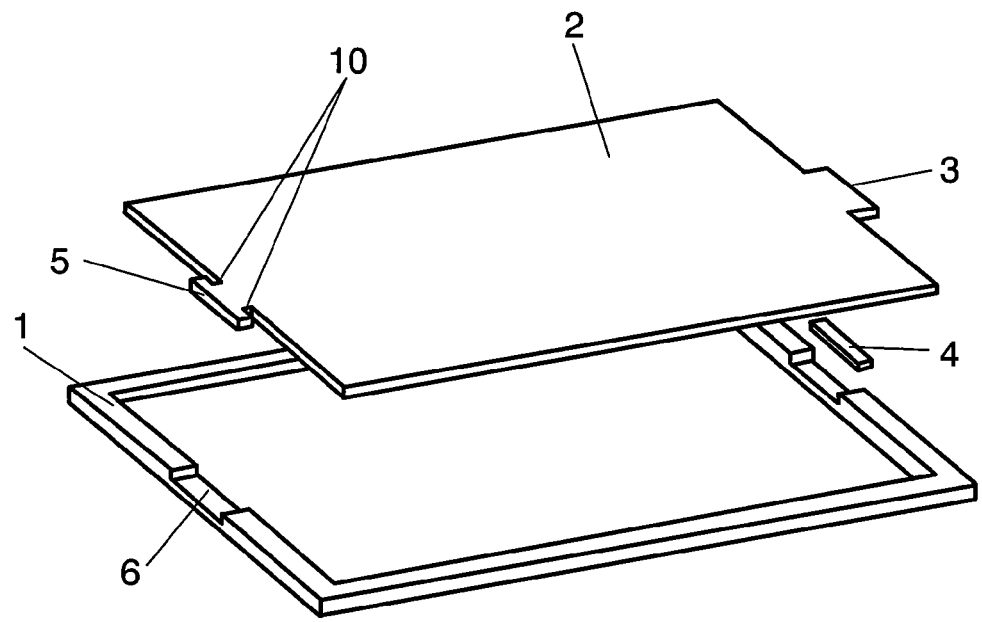
FIG. 1 is a perspective view of a liquid crystal display apparatus in accordance with the first embodiment of the present invention.

FIG. 1 is a perspective view of a liquid crystal display apparatus in the first exemplary embodiment of the present invention. Only resin frame 1, optical sheet 2, and double-sided tape 4 are illustrated in FIG. 1; no liquid crystal display, light guide plate, reflection sheet, tubular light source, metal bezel, or driving circuit board are shown. As shown in FIG. 1, in the liquid crystal display apparatus in the first exemplary embodiment, first fixing portion 3 provided at one side of optical sheet 2 is secured onto resin frame 1 with double-sided tape 4. Second fixing portion 5, provided at the side opposite the side on which first fixing portion 3 is provided, is not secured with double-sided tape, but fitted to concavity 6 created at resin frame 1 at a part corresponding to second fixing portion 5 so as to attach optical sheet 2 to resin frame 1. Optical sheet 2 has rectangular notch 10.

Figure 2:
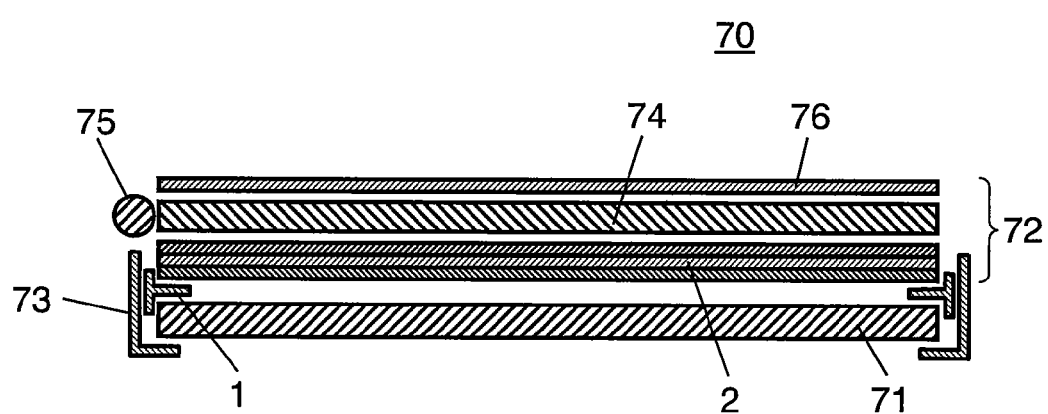
FIG. 2 is a sectional view illustrating a structure of the liquid crystal display apparatus in accordance with the first embodiment of the present invention.

FIG. 2 is a sectional view illustrating the structure of liquid crystal display apparatus 70 in the first embodiment of the present invention. Liquid crystal display apparatus 70 includes light-transmitting liquid crystal panel 71 configured with a liquid crystal layer held between a pair of glass substrates, and surface light-source unit 72 overlaid on the surface of liquid crystal panel 71. Liquid crystal panel 71 is placed on substantially rectangular resin frame 1, and metal bezel 73 underlaid on liquid crystal panel 71 is attached to this resin frame 1. Liquid crystal panel 71 is thus interposed and held between resin frame 1 and metal bezel 73.

Surface light-source unit 72 includes light guide plate 74 and tubular light source (fluorescent tube) 75 provided at one end facing light guide plate 74. Optical sheet 2, including multiple sheets such as a diffusing sheet and a prism sheet, is provided at the light-emitting side of light guide plate 74 for controlling the light-emitting characteristic. Reflection sheet 76 is provided at a face opposite the light-emitting side. In this structure, light from tubular light source 75 is led by light guide plate 74, and diffused uniformly on the light-emitting face by optical sheet 2.

Light guide plate 74, optical sheet 2, reflection sheet 76, and tubular light source 75, which configure the surface light source unit 72, are attached to resin frame 1. More specifically, in liquid crystal display apparatus 70, liquid crystal panel 71, resin frame 1, optical sheet 2, light guide plate 74, and reflection sheet 76 are overlaid in this sequence from the light-emitting side. Tubular light source 75 is disposed at one end of light guide plate 74, and metal bezel 73 and resin frame 1 sandwich and hold liquid crystal panel 71.

Figure 3:
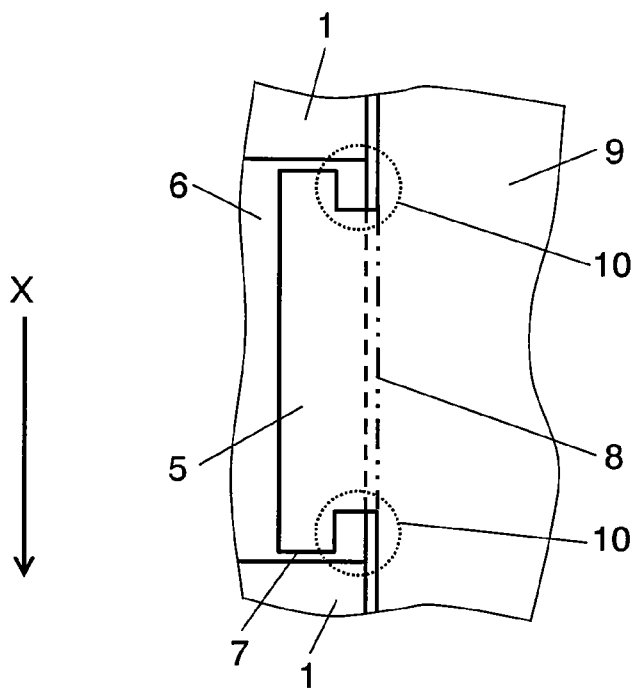
FIG. 3 is a fragmentary plan view illustrating the details of the liquid crystal display apparatus which has a rectangular notch in accordance with the first embodiment of the present invention.

FIG. 3 is a fragmentary plan view illustrating the details of liquid crystal display apparatus 70 which has rectangular notch 10 in the first embodiment of the present invention. An area around second fixing portion 5 is magnified to reveal the structure of liquid crystal display apparatus 70. As shown in FIG. 3, liquid crystal display apparatus 70 in the first embodiment includes resin frame 1, concavity 6 created at resin frame 1, second fixing portion 5 provided at optical sheet 2, positioning area 6, boundary area 8, and at least one notch 10 created ion boundary area 8. Notch 10 is created at a longer direction of second fixing portion 5 at boundary area 8 between display area 9 of optical sheet 2 and second fixing portion 5. In addition, two notches 10 may be created. In the first embodiment, as shown in FIG. 3, one notch 10 is created at a side of second fixing portion 5 and another notch 10 is created at a side in a longer direction opposite the side of second fixing portion 5 where the notch is already created.

Figure 4:
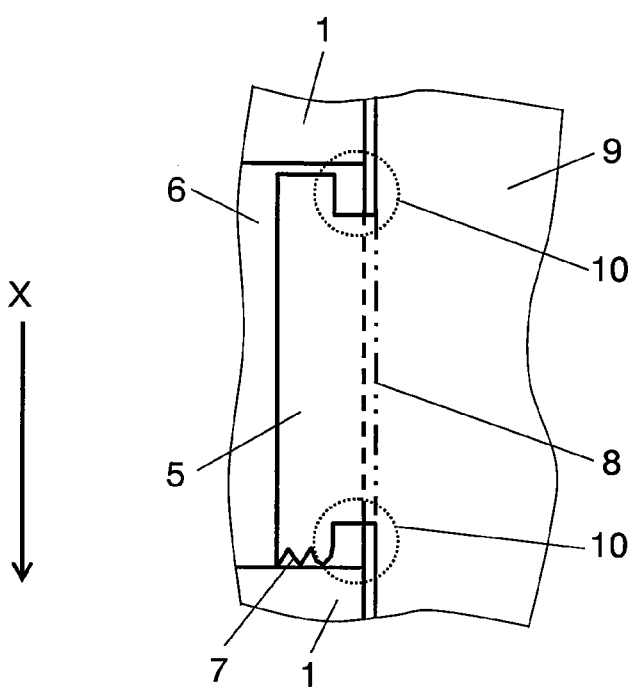
FIG. 4 is a fragmentary plan view illustrating the operation of the liquid crystal display apparatus in accordance with the first embodiment of the present invention.

The operation of liquid crystal display apparatus 70 as configured above is described below with reference to FIGS. 3 and 4. FIG. 4 is a fragmentary plan view illustrating the operation of liquid crystal display apparatus 70 in the first embodiment of the present invention.

Figure 19:
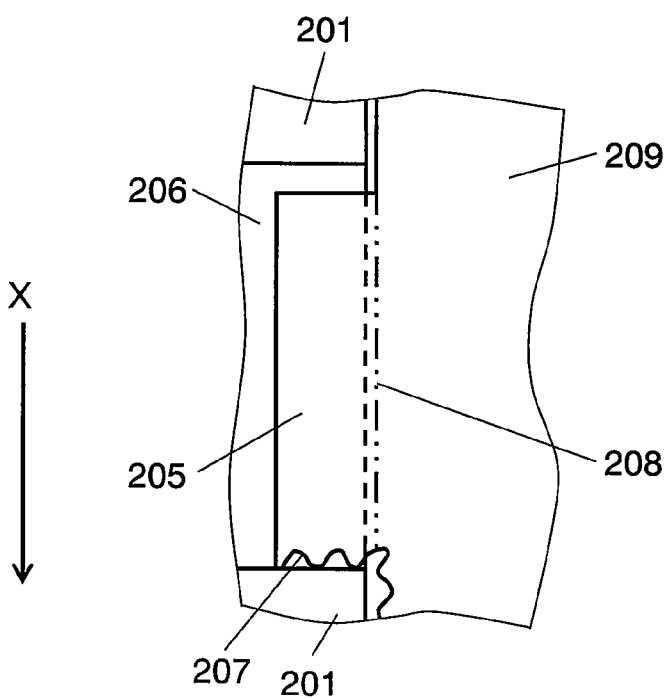
FIG. 19 is a fragmentary plan view illustrating the operation of the conventional liquid crystal display apparatus.

If a mechanical stress in direction X is applied in the state shown in FIG. 3, optical sheet 2 moves in direction X as shown in FIG. 4. In this case, positioning area 7 of optical sheet 2 contacts the wall of concavity 6 and positioning area 7 deforms. However, rectangular notch 10 created at the boundary area significantly reduces the extension of any detrimental effects of this deformation to display area 9. More specifically, in conventional liquid crystal display apparatus 270 shown in FIG. 19, such deformation causes distortion in boundary area 208 and display area 209 of optical sheet 202. However, in liquid crystal display apparatus 70 in the first embodiment shown in FIG. 4, only positioning area 7 of optical sheet 2 deforms, and no deformation occurs in display area 9.

As described above, in liquid crystal display apparatus 70 in the first embodiment, provision of notch 10 between second fixing portion 5 and display area 9 of optical sheet 2 prevents the extension of deformation in optical sheet 2 to its display area 9 even if a large mechanical stress, such as drop impact, is applied. Accordingly, the present invention eliminates display failure caused by deformation of the optical sheet 2, and thus offers a highly reliable liquid crystal display apparatus which can display high-quality images.

Figure 5:
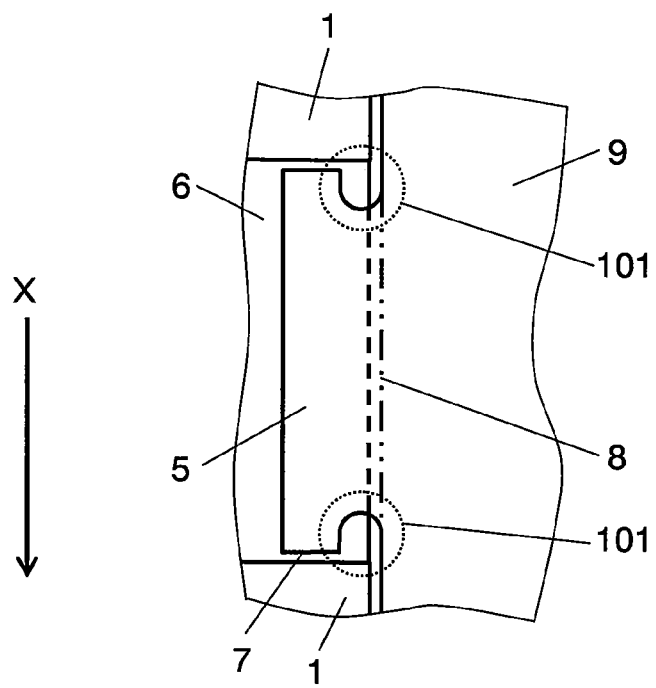
FIG. 5 is a fragmentary plan view illustrating the details of the liquid crystal display apparatus which has a semi-circular notch in accordance with the first embodiment of the present invention.
Figure 6:
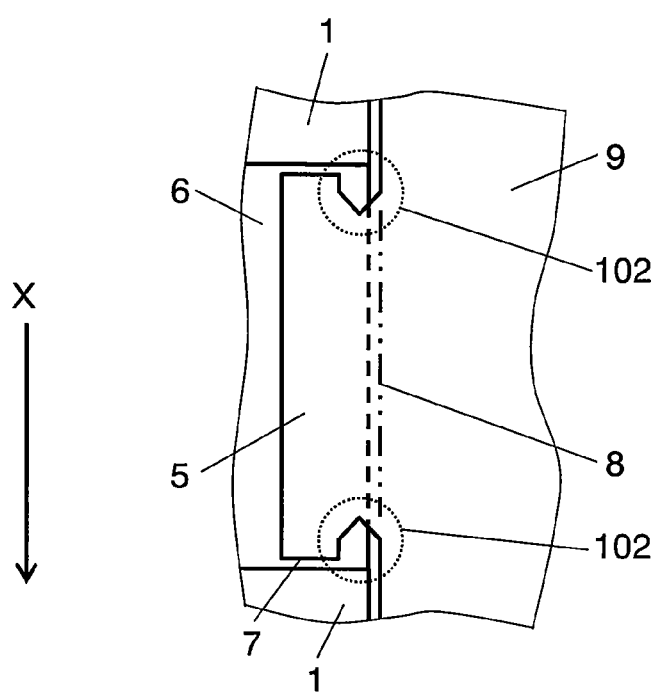
FIG. 6 is a fragmentary plan view illustrating the details of the liquid crystal display apparatus which has a triangular notch in accordance with the first embodiment of the present invention.

In the first embodiment, the shape of notch 10 is substantially rectangular. However, any other shapes, such as slit and semi-circular notch, are applicable as long as the deformation in positioning area 7 is impeded from being transferred to display area 9. FIG. 5 is a fragmentary plan view illustrating the details of liquid crystal display apparatus 70 which has semi-circular notch 101. FIG. 6 is a fragmentary plan view illustrating the details of liquid crystal display apparatus 70 which has triangular notch 102 in the first embodiment of the present invention.

In these structures, positioning area 7 of optical sheet 2 contacts the wall of concavity 6 and positioning area 7 deforms when optical sheet 2 moves in direction X due to mechanical stress being applied in direction X. However, semi-circular notch 101 or triangular notch 102 in optical sheet 2 of liquid crystal display apparatus 70 reduces the extension of any detrimental effects of this deformation to display area 9 to a greater extent than linear notch 10 in FIG. 3, further reducing the effect of deformation.

In the above description, notch 10 is formed in boundary area 8. However, a position to create notch 10 is changeable in line with a change in location of positioning area 7. More specifically, notch 10 can be created inward to second fixing portion 5 from boundary area 8 to display area 9.

In the first embodiment, notch 10 is created only in second fixing portion 5. However, a notch may also be created at first fixing portion 3, in the same way as second fixing portion 5, without using double-sided tape 4 for securing first fixing portion 3 onto resin frame 1. The number of fixing portions may also be increased, in addition to second fixing portion 5, and concavity 6 corresponding to each fixing portion may be created at resin frame 1. This further reduces the extension of any detrimental effects of deformation in each fixing portion to display area 9.

In the description of the first embodiment with reference to FIG. 1, first fixing portion 3 provided at one side of optical sheet 2 is secured onto resin frame 1 with double-sided tape 4. This is to facilitate assembly of liquid crystal display apparatus 70 by tentatively securing first fixing portion 3 onto resin frame 1 with double-sided tape 4. Accordingly, first fixing portion 3 need not be always secured onto resin frame 1 with double-sided tape 1, same as second fixing portion 5, as long as assembly at the side of first fixing portion 3 can be conducted in an efficient manner without tentative fixing with the double-sided tape.

Still more, the shape of second fixing portion shown in FIG. 3 is applied to optical sheet 2 in the first embodiment. However, this shape may be applied to light guide plate 74 or reflection sheet 76, or two or more of optical sheet 2, light guide plate 74, and reflection sheet 76, shown in FIG. 2, attached and combined together. This also prevents the extension of deformation to display area 9 of light guide plate 74 or reflection sheet 76.

Figure 7:
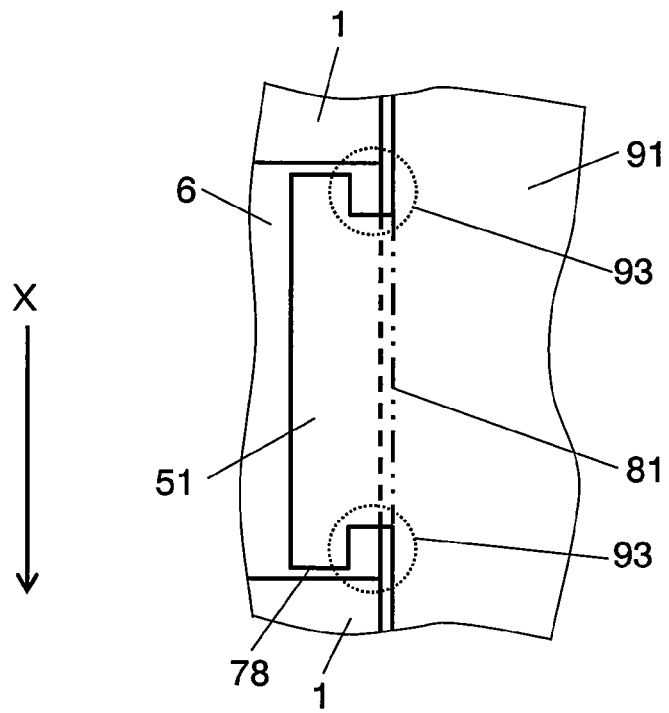
FIG. 7 is a fragmentary plan view illustrating the details of the liquid crystal display apparatus which has a rectangular notch in a light guide plate in accordance with the first embodiment of the present invention.

FIG. 7 is a fragmentary plan view illustrating the details of liquid crystal display apparatus 70 which has rectangular notch 93 in light guide plate 74 in the first embodiment of the present invention. Light guide plate 74 includes third fixing portion 51, display area 91, boundary area 81, rectangular notch 93 created at boundary area 81, and positioning area 78. Reflection sheet 76 may also have the same structure. In other words, this liquid crystal display apparatus 70 further includes reflection sheet 76 on the side opposite the light-emitting face relative to light guide plate 74. A third fixing portion (not illustrated) provided at one side of at least light guide plate 74 or reflection sheet 76 fits into a concavity (not illustrated) created at resin frame 1 for securing onto resin frame 1. Fourth fixing portion 52 provided at the side opposite the side on which the third fixing portion is provided is fitted into concavity 6 created at resin frame 1 at a part corresponding to third fixing portion 51 such that light guide plate 74 and reflection sheet 76 are attached to resin frame 1. At least one notch 93 is provided in a longer direction of the third fixing portion 51 or fourth fixing portion 52 at boundary area 81 between display area 91 of light guide plate 74 or reflection sheet 76 and at least the third fixing portion or fourth fixing portion 51 52.

With this structure, positioning area 78 of light guide plate 74 contacts the wall of concavity 6 and positioning area 78 deforms if a mechanical stress is applied in direction X. However, notch 93 created at boundary area 81 significantly reduces the extension of any detrimental effects of this deformation to display area 91 of light guide plate 74.

Second Embodiment

Figure 8:
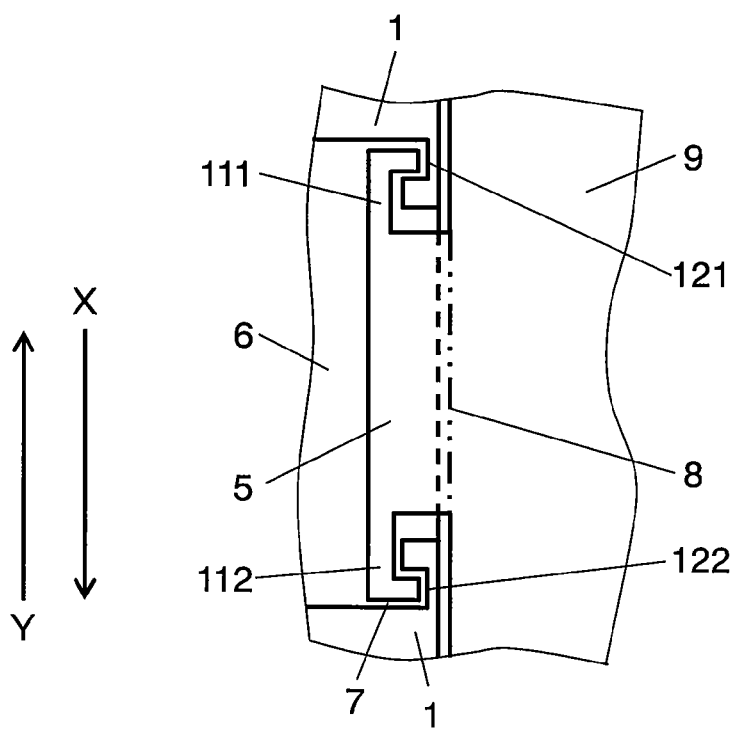
FIG. 8 is a fragmentary plan view illustrating the details of a liquid crystal display apparatus which has an L-shaped protrusion in a positioning area in accordance with the second embodiment of the present invention.

A liquid crystal display apparatus in the second embodiment of the present invention is described with reference to drawings. Components which are the same as those in the first exemplary embodiment are given the same reference marks to avoid redundancy. FIG. 8 is a fragmentary plan view illustrating the details of liquid crystal display apparatus 70 which has L-shaped protrusions in positioning areas 111 and 112 in the second embodiment. As shown in FIG. 8, liquid crystal display apparatus 70 in the second embodiment is characterized by the L-shaped protrusions in positioning areas 111 and 112 of second fixing portion 5 provided at optical sheet 2, and curved portions 121 and 122 processed on concavity 6 of resin frame 1 in a way such that to engage with the L-shaped protrusions.

The L-shaped protrusions of positioning areas 111 and 112 protruding from second fixing portion 5 and curved portions 121 and 122 of resin frame 1 corresponding to L-shaped protrusions are created at the shapes shown in FIG. 8 such that the L-shaped protrusion of positioning area 111 and curved portion 121 corresponding to this protrusion, and the L-shaped protrusion of positioning area 112 and curved portion 122 corresponding to this protrusion are engaged, respectively. Accordingly, if an acute impact such as by dropping is applied in direction X, the protrusion of positioning area 111 in optical sheet 2 is trapped and held by curved portion 121, and the protrusion of positioning area 112 contacts the wall of concavity 6 in resin frame 1. Since the protrusion is supported, the impact is dispersed among positioning area 111, curved portion 121 (upper side), positioning area 112, and curved portion 122 (lower side). Accordingly, there is less risk of distortion of positioning area 111 than in the first embodiment, and thus distortion is less likely to extend to display area 9.

In the same way, if an acute impact, such as by dropping, is applied in direction Y, opposite direction X, the protrusion of positioning area 112 is trapped and held by curved portion 122, and the protrusion of positioning area 111 contacts the wall of concavity 6 in resin frame 1. Since the protrusion is supported, the impact is dispersed among positioning area 112, curved portion 122 (lower side), positioning area 111, and curved portion 121 (upper side). Accordingly, there is less risk of distortion of positioning area 112 than in the first embodiment, and thus distortion is less likely to extend to display area 9.

As described above, in the second embodiment, the L-shaped protrusions of positioning areas 111 and 112 protruding from second fixing portion 5 of optical sheet 2 and curved portions 121 and 122 corresponding to the protrusions, formed in concavity 6 of resin frame 1, prevent the extension of deformation in optical sheet 2 to display area 9 even if a large mechanical stress, such as a drop impact, is applied. Accordingly, the present invention eliminates display failure caused by deformation of optical sheet 2, and thus offers a highly-reliable liquid crystal display apparatus which can display high-quality images.

Figure 9:
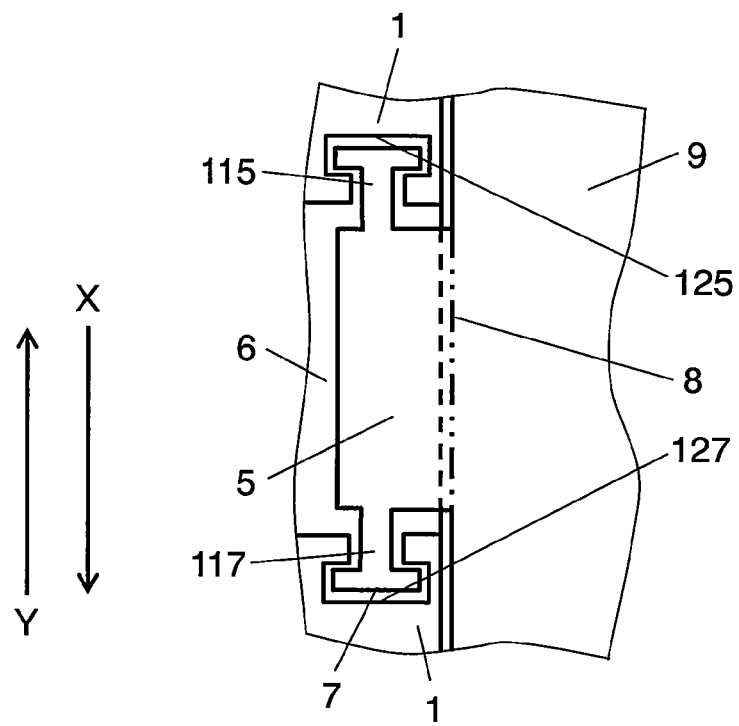
FIG. 9 is a fragmentary plan view illustrating the details of the liquid crystal display apparatus which has a T-shaped protrusion at the positioning area in accordance with the second embodiment of the present invention.

In the second embodiment, the L-shaped protrusions are formed in positioning areas 111 and 112, respectively, in second fixing portion 5 of optical sheet 2. However, T-shaped protrusions may be formed in positioning areas 115 and 117 of second fixing portion 5, as shown in FIG. 9. In this case, T-curved portion 125 is processed in concavity 6 of resin frame 1, corresponding to the T-shaped protrusion of positioning area 115, in a way such that T-curved portion 125 surrounds the T-shaped protrusion of positioning area 115. In the same way, T-curved portion 127 is processed in concavity 6 of resin frame 1 in a way such that T-curved portion 127 surrounds the T-shaped protrusion of positioning area 117.

With this structure, the T-shaped protrusion of positioning area 115 and T-curved portion 125, and the T-shaped protrusion of positioning area 117 and T-curved portion 127 are engaged, respectively. Accordingly, if an acute impact such as by dropping is applied in direction X, T-shaped protrusion of positioning area 115 in optical sheet 2 is trapped and held by T-curved portion 125, and the protrusion of positioning area 117 contacts the wall of concavity 6 in resin frame 1. Since the protrusion is supported, the impact is dispersed among positioning area 115, T-curved portion 125 (upper side), positioning area 117, and T-curved portion 127 (lower side). Accordingly, there is less risk of distortion of positioning area 115 than in the first embodiment, and thus distortion is less likely to extend to display area 9. In the same way, if an acute impact such as by dropping is applied in direction Y, opposite direction X, the T-shaped protrusion of positioning area 117 is trapped and held by T-curved portion 127, and the protrusion of positioning area 115 contacts the wall of concavity 6 in resin frame 1. Since the protrusion is supported, the impact is dispersed among positioning area 117, T-curved portion 127 (lower side), positioning area 115, and T-shaped protrusion 125 (upper side). Accordingly, there is less risk of distortion of positioning area 117 than in the first embodiment, and thus the distortion is less likely to extend to display area 9.

The T-shaped protrusions of positioning areas 115 and 117 increase points to trap and hold, compared to the L-shaped protrusions. In addition, the protrusions can be supported even if an acute impact is applied in a direction other than directions X and Y because curved portions 125 and 127 surround positioning areas 115 and 117. Accordingly, even if positioning area 117 is distorted due to an acute impact, the extension of distortion to display area 9 is further reduced.

In the above description, the T-shaped protrusions are processed in positioning areas 115 an 117 of second fixing portion formed in optical sheet 2. However, the protrusions may have trapezoidal, circular or oval tip, for example, so that the tips become broader. Curved portions may be processed in concavity 6 of resin frame 1 in a way such that to surround these protrusions. This structure also achieves the same effect.

In the second embodiment, the shape of second fixing portion 5 shown in FIG. 8 is applied to optical sheet 2. However, this shape may be applied to light guide plate 74 or reflection sheet 76, or two or more of optical sheet 2, light guide plate 74, and reflection sheet 76, shown in FIG. 2, attached and combined together. This further reduces the extension of any detrimental effects of the deformation to display area 9 of light guide plate 74 or reflection sheet 76.

Figure 10:
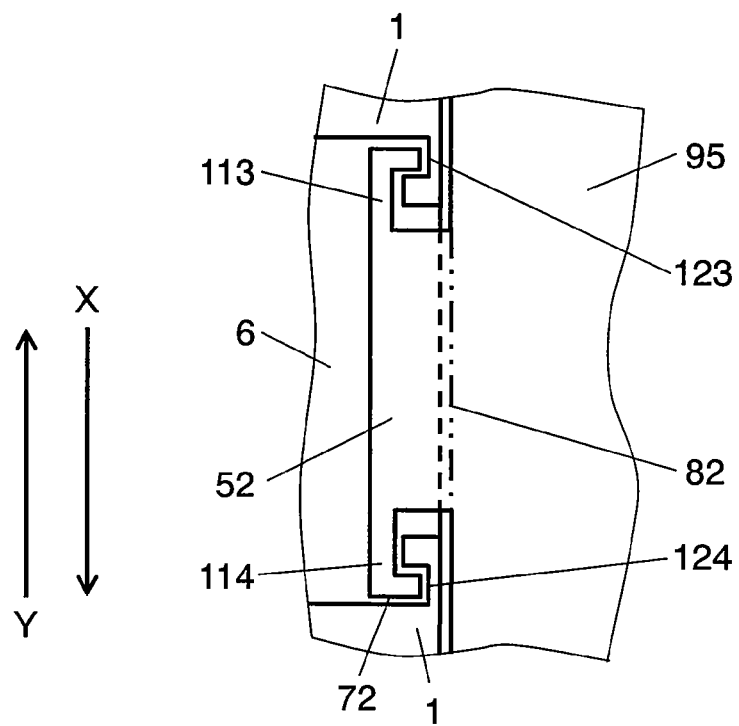
FIG. 10 is fragmentary plan view illustrating the details of the liquid crystal display apparatus which has an L-shaped protrusion in a positioning area of a light guide plate in accordance with the second embodiment of the present invention.

FIG. 10 is a fragmentary plan view illustrating the details of liquid crystal display apparatus 70 which has an L-shaped protrusion in positioning areas 113 and 114 of light guide plate 74 in the second embodiment of the present invention. Light guide plate 74 includes display area 95 and L-shaped protrusions protruding from positioning areas 113 and 114 of fourth fixing portion 52. Resin frame 1 has curved portions 123 and 124 processed in concavity 6 so as to be engaged with the L-shaped protrusions. Reflection sheet 76 may also have the same structure. In other words, liquid crystal display apparatus 70 further includes reflection sheet 76 on the side opposite the light-emitting face relative to light guide plate 74. A third fixing portion (not illustrated) provided at one side of at least light guide plate 74 or reflection sheet 76 fits into a concavity (not illustrated) created at resin frame 1 for securing onto resin frame 1. Fourth fixing portion 52, provided at the side opposite the side on which the third fixing portion is provided, is fitted into concavity 6 created at resin frame 1 at a part corresponding to fourth fixing portion 52 so that light guide plate 74 and reflection sheet 76 are attached to resin frame 1. At least positioning area 113 or 114 of the third fixing portion or fourth fixing portion 52 has the protrusions protruding toward concavity 6 in resin frame 1, and resin frame 1 has curved portions 123 and 124 in concavity 6, processed corresponding to the protrusions. The protrusions of positioning area 113 and 114 and curved portions 123 and 124 in resin frame 1 are engaged, respectively.

With this structure, if an acute impact such as by dropping is applied in direction X, the protrusion of positioning area 113 of light guide plate 74 is trapped and held by curved portion 123, and the protrusion of positioning area 114 contacts and is supported by the wall of concavity 6 in resin frame 1. Accordingly, the impact is dispersed among positioning area 113, curved portion 123 (upper side), positioning area 114, and curved portion 124 (lower side). There is less risk of distortion of positioning area 114 than in the first embodiment, and the distortion is less likely to extend to display area 95 of light guide plate 74. In the same way, if an acute impact such as by dropping is applied in direction Y, opposite direction X, the protrusion of positioning area 114 is trapped and held by curved portion 124, and the protrusion of positioning area 113 contacts and is supported by the wall of concavity 6 in resin frame 1. Accordingly, the impact is dispersed among positioning area 114, curved portion 124 (lower side), positioning area 113, and curved portion 123 (upper part). There is less risk of distortion of positioning area 114 than in the first embodiment, and thus the distortion is less likely to extend to display area 95 of light guide plate 74.

Third Embodiment

Figure 11:
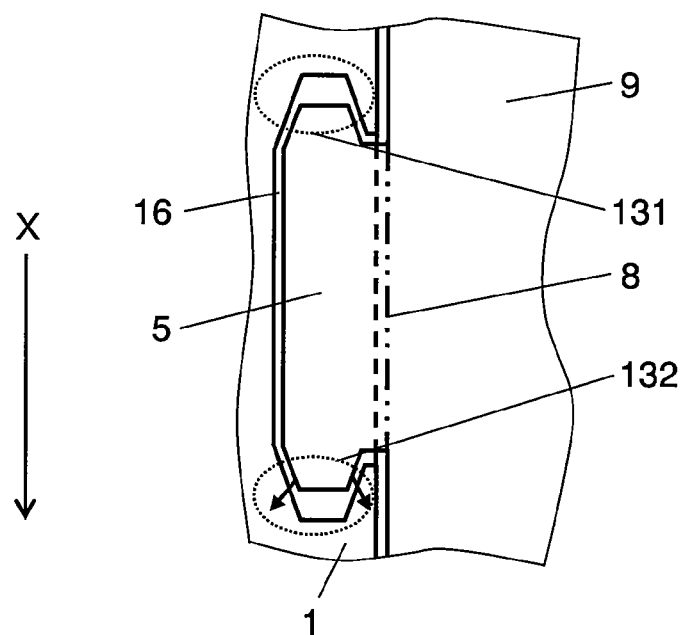
FIG. 11 is a fragmentary plan view illustrating the details of a liquid crystal display apparatus which has a trapezoidal protrusion in a positioning area in accordance with the third embodiment of the present invention.

A liquid crystal display apparatus in the third embodiment of the present invention is described with reference to drawings. Components which are the same as those in the first embodiment are given the same reference marks to avoid redundancy. FIG. 11 is a fragmentary plan view illustrating the details of liquid crystal display apparatus 70 which has trapezoidal protrusions in positioning areas 131 and 132 in the third embodiment of the present invention. As shown in FIG. 11, liquid crystal display apparatus 70 in the third embodiment is characterized by its trapezoidal protrusions of positioning areas 131 and 132 protruding from second fixing portion 5 formed on optical sheet 2, and curved portions of concavity 16 in resin frame 1 processed in a way such that to contact the trapezoidal protrusions of positioning areas 131 and 132 in second fixing portion 5.

With this structure, if a mechanical stress is applied in direction X in the state shown in FIG. 11, the stress is dispersed in optical sheet 2 in a direction of arrow, shown in FIG. 11, around the protrusion of positioning area 132. As a result, deformation of optical sheet 2 near positioning area 132 of second fixing portion 5 is less likely to extend to display area 9. Accordingly, the third embodiment eliminates display failure caused by deformation of optical sheet 2, and thus offers a highly reliable liquid crystal display apparatus which can display high-quality images.

Figure 12:
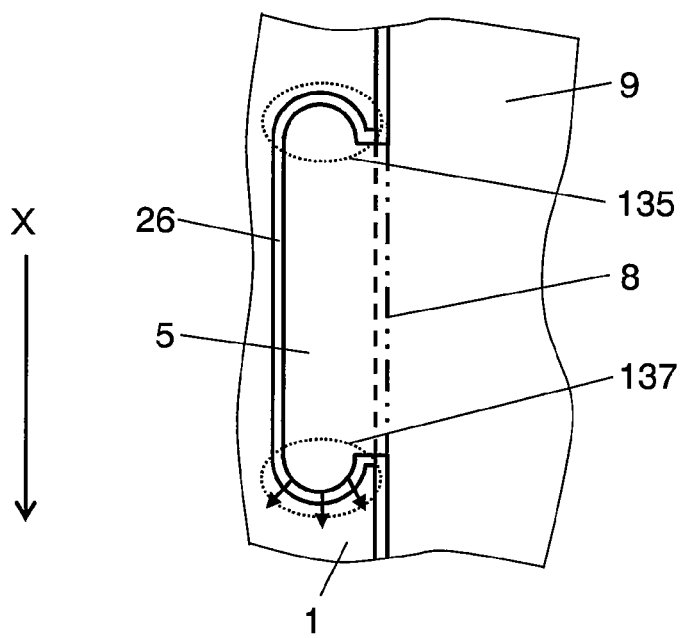
FIG. 12 is a fragmentary plan view illustrating the details of the liquid crystal display apparatus which has a semi-circular protrusion at the positioning area in accordance with the third embodiment of the present invention.

FIG. 12 is a fragmentary plan view illustrating the details of liquid crystal display apparatus 70 which has semi-circular protrusions in positioning areas 135 and 137 in the third embodiment. Positioning areas 131 and 132 have trapezoidal protrusions shown in FIG. 11. In FIG. 12, positioning area 131 and 132 have substantially semi-circular protrusions protruding toward concavity 26, and curved portions are processed in concavity 26 in a way such that to contact the semi-circular protrusions of positioning areas 131 and 132.

Also with this structure, if a mechanical stress is applied in direction X in the state shown in FIG. 12, the stress is dispersed in optical sheet 2 in a direction of arrow, shown in FIG. 12, around the protrusion of positioning area 137. As a result, deformation of optical sheet 2 near positioning area 137 of second fixing portion 5 is less likely to extend to display area 9.

Figure 13:
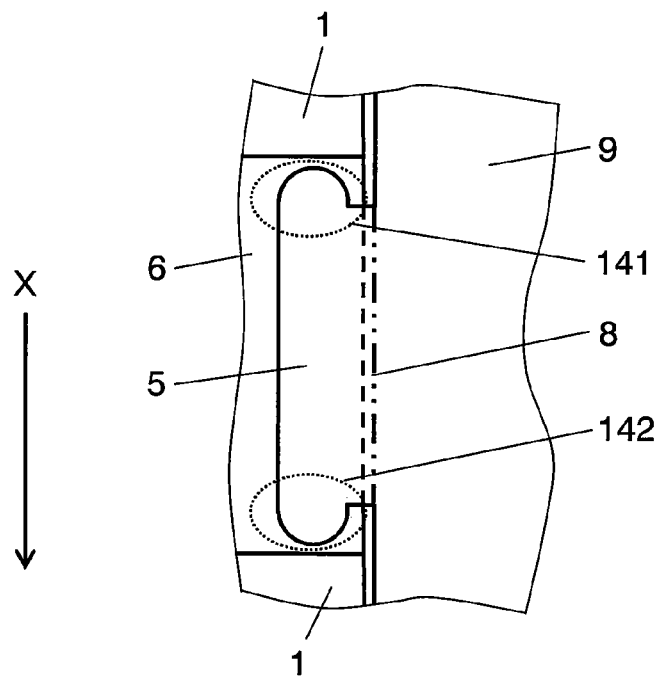
FIG. 13 is a fragmentary plan view illustrating the details of a liquid crystal display apparatus in another embodiment of the present invention.

Liquid crystal display apparatus 70 in the first embodiment has rectangular positioning area 7 shown in FIG. 3. However, substantially semi-circular protrusions, as shown in FIG. 13, may be created at positioning areas 141 and 142. FIG. 13 is a fragmentary plan view illustrating the details of liquid crystal display apparatus 70 in another embodiment of the present invention. Positioning areas 141 and 142 shown in FIG. 13 have substantially semi-circular protrusions, and are provided at second fixing portion 5 of optical sheet 2. These positioning areas 141 and 142 are formed in a way such that to contact the wall of concavity 6 created at resin frame 1.

With this structure, if an acute impact such as by dropping is applied in direction X, the semi-circular protrusion of positioning area 142 easily crushes, and the stress caused by the impact is absorbed by the protrusion of positioning area 142. Accordingly, the deformation of optical sheet 2 around positioning area 7 is less likely to extend to display area of optical sheet 2.

Figure 14:
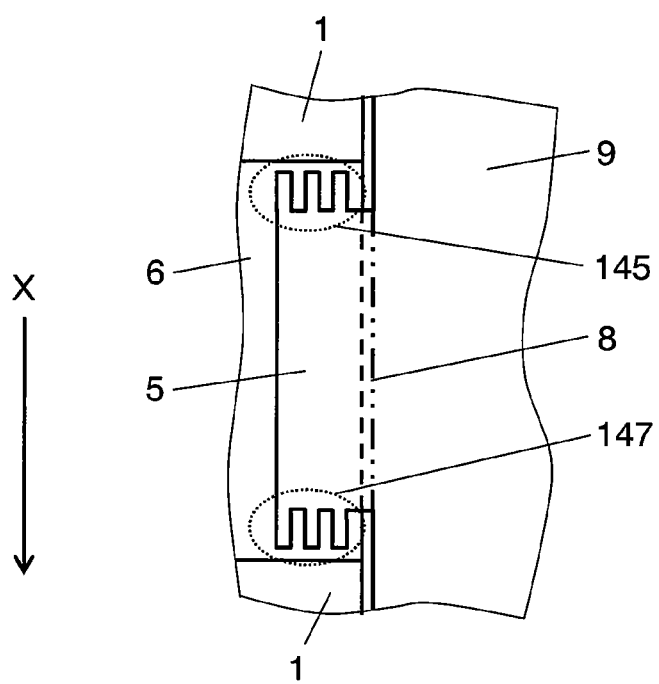
FIG. 14 is a fragmentary plan view illustrating details of a liquid crystal display apparatus in still another embodiment of the present invention.

Still more, as shown in FIG. 14, multiple rectangular slits may be provided at second fixing portion 5 of optical sheet 2, and each of positioning areas 145 and 147 has a rectangular protrusion divided into multiple portions. As shown in FIG. 14, multiple rectangular slits are created at positioning areas 145 and 147, and a tip of each of rectangular protrusions contacts the wall of concavity 6 created at resin frame 1.

With this structure, if an acute impact such as by dropping is applied in direction X, the tips of the protrusions of positioning area 147, where multiple rectangular slits are created, easily crush and the stress caused by the impact is absorbed by the protrusions of positioning area 147. Accordingly, the deformation of optical sheet 2 around positioning area 147 is less likely to extend to display area of optical sheet 2.

Figure 15:
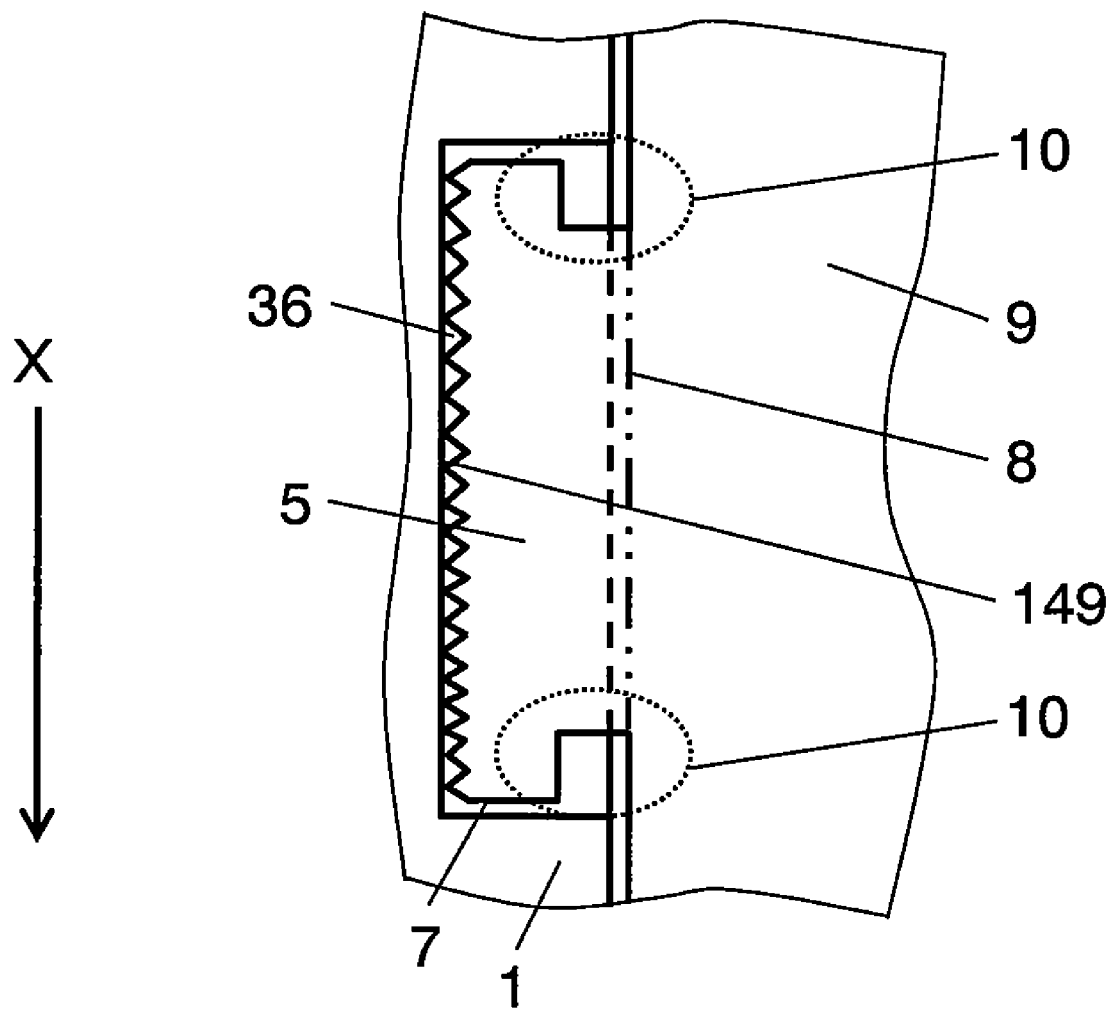
FIG. 15 is a fragmentary plan view illustrating details of a liquid crystal display apparatus in still another embodiment of the present invention.
Figure 16A:
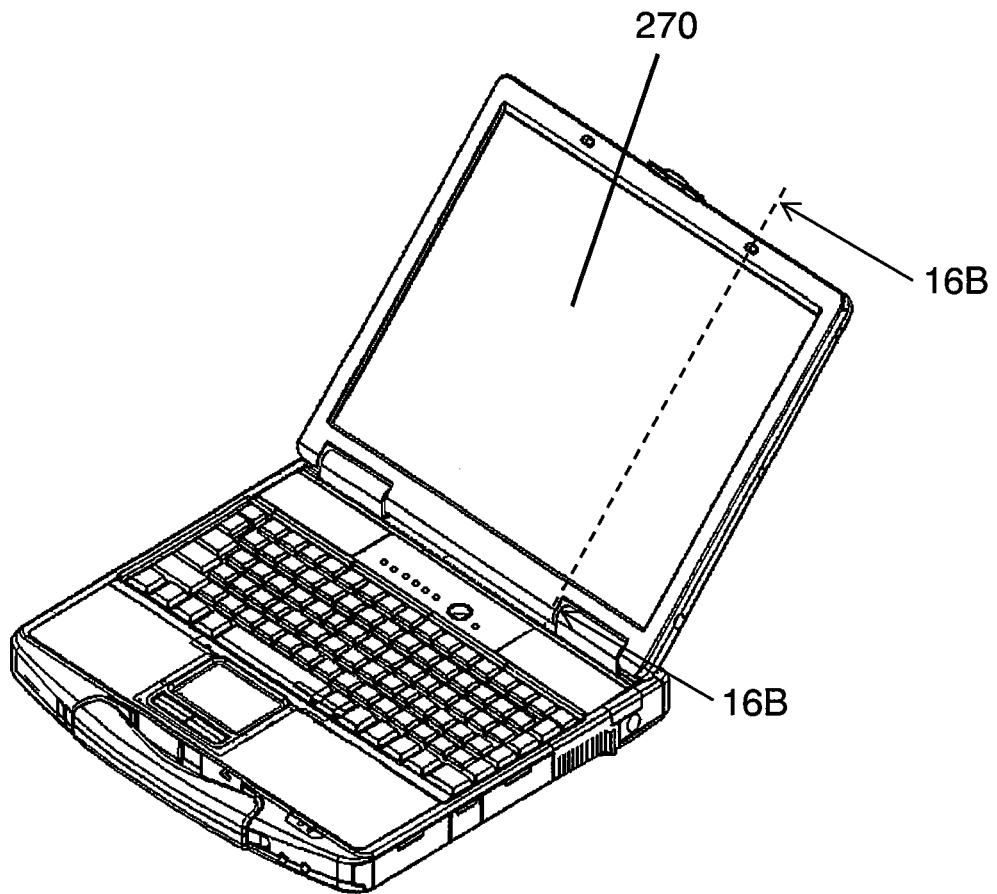
FIG. 16A is a perspective view of a mobile electronic device employing a conventional liquid crystal display apparatus.
Figure 16B:
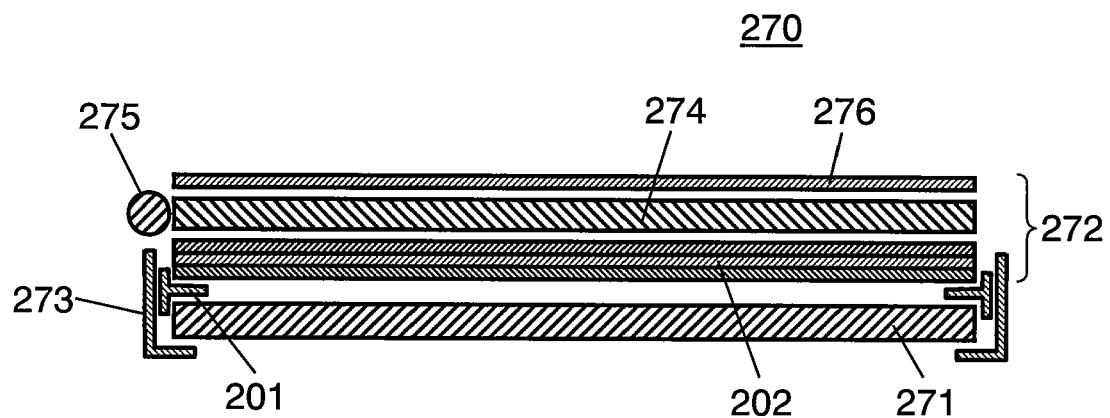
FIG. 16B is a sectional view illustrating a structure of the conventional liquid crystal display apparatus.
Figure 17:
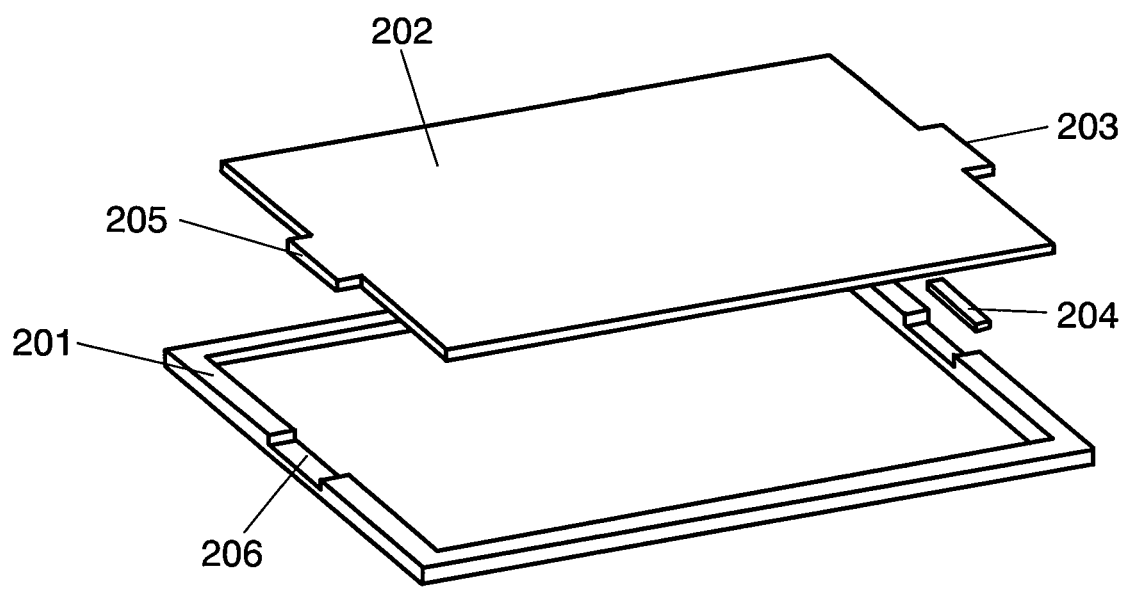
FIG. 17 is a perspective view of the conventional liquid crystal display apparatus.
Figure 18:
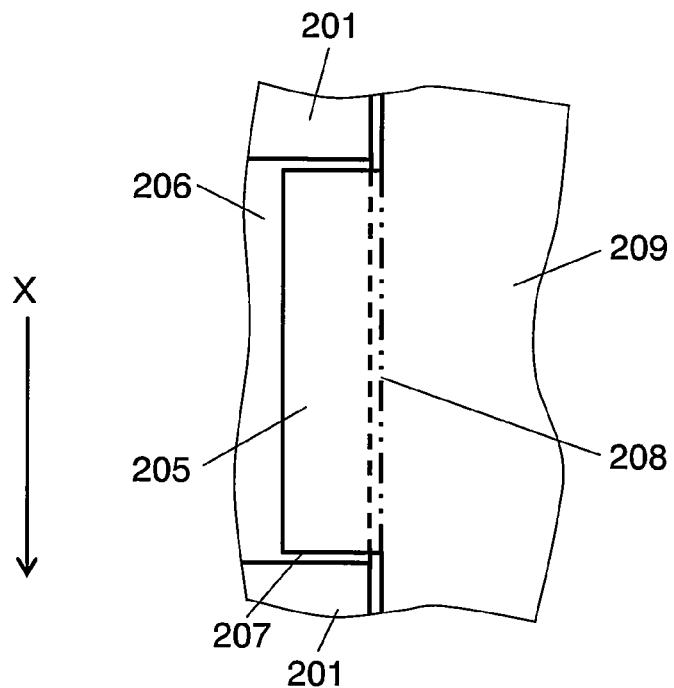
FIG. 18 is a fragmentary plan view illustrating details of the conventional liquid crystal display apparatus.

Furthermore, as shown in FIG. 15, multiple protrusions 149 may be created at the first fixing portion (not illustrated) or second fixing portion 5. As shown in FIG. 15, protrusions 149 created at second fixing portion 5 contact the wall of concavity 36, created at resin frame 1, parallel to boundary area 8.

With this structure, if an acute impact such as by dropping is applied in direction X, the stress caused by the impact can be absorbed by friction between protrusions 149 created at second fixing portion 5 and the wall of concavity 36 created at resin frame 1. Accordingly, notch 10 created at second fixing portion 5 can further reduce the extension of deformation of positioning area 7 to display area 9 of optical sheet 2.

What is claimed is:

1. A liquid crystal display apparatus, comprising:
   a light guide plate for leading light from a light source;
   an optical sheet for uniformly diffusing the light from the light source led by the light guide plate toward a light-emitting face; and
   a resin frame onto which the optical sheet is attached;
   wherein
   a first fixing portion, provided at one side of the optical sheet, is fitted into a concavity created at the resin frame to be secured at the resin frame;
   a second fixing portion, provided at a side opposite the side at which the first fixing portion is provided, is fitted into a concavity created at the resin frame at a part corresponding to the second fixing portion so that the optical sheet is attached to the resin frame; and
   at least one notch is created at a longer direction of one of the first fixing portion and the second fixing portion at a boundary area between a display area of the optical sheet and at least one of the first fixing portion and the second fixing portion.

2. The liquid crystal display apparatus of claim 1, wherein another notch is created at one of the first fixing portion and the second fixing portion at a side opposite the side of one of the first fixing portion and the second fixing portion where the notch is created.

3. The liquid crystal display apparatus of claim 1, wherein one of the first fixing portion and the second fixing portion without notch is secured at the resin frame with a double-sided tape.

4. The liquid crystal display apparatus of claim 1, wherein the notch is a rectangular notch.

5. The liquid crystal display apparatus of claim 1, wherein the notch is one of semi-circular notch and triangular notch.

6. The liquid crystal display apparatus of claim 1, further comprising:
a reflection sheet at an opposite side of a light-emitting face relative to the light guide plate,
wherein
a third fixing portion is provided at one side of at least one of the light guide plate and the reflection sheet, the third fixing portion being fitted to the concavity created at the resin frame to be secured at the resin frame,
a fourth fixing portion is provided at a side opposite the side at which the third fixing portion is provided, the fourth fixing portion being fitted into the concavity created at the resin frame at a part corresponding to the fourth fixing portion so that the light guide plate and the reflection sheet are attached to the resin frame, and
at least one notch is created at a longer direction of one of the third fixing portion and the fourth fixing portion at a boundary area between a display area of one of the light guide plate and the reflection sheet and one of the third fixing portion and the fourth fixing portion.

7. The liquid crystal display apparatus of claim 1, wherein a positioning area of one of the first fixing portion and the second fixing portion where the notch is created has a protrusion, the protrusion being formed in a way such that to contact the concavity.

8. The liquid crystal display apparatus of claim 7, wherein the protrusion of the positioning area is a substantially semi-circular protrusion.

9. The liquid crystal display apparatus of claim 7, wherein the protrusion of the positioning area is divided into a plurality of rectangular protrusions.

10. The liquid crystal display apparatus of claim 7, wherein the protrusion of the positioning area is a trapezoidal protrusion protruding toward the concavity, and a curved portion is formed at the concavity so as to contact the protrusion.

11. The liquid crystal display apparatus of claim 7, wherein the protrusion of the positioning area is a substantially semi-circular protrusion protruding toward the concavity, and a curved portion is formed at the concavity so as to contact the protrusion.

12. The liquid crystal display apparatus of claim 1, wherein one of the first fixing portion and the second fixing portion further comprises a plurality of protrusions contacting a wall of the concavity, the wall being parallel to the boundary area.

13. A liquid crystal display apparatus, comprising:
a light guide plate for leading light from a light source
an optical sheet for uniformly diffusing the light of the light source led by the light guide plate toward a light-emitting face; and
a resin frame onto which the optical sheet is attached,
wherein
a first fixing portion, provided at one side of the optical sheet, is fitted into a concavity created at the resin frame to be secured at the resin frame,
a second fixing portion, provided at a side opposite the side at which the first fixing portion is provided, is fitted into a concavity created at the resin frame at a part corresponding to the second fixing portion so that the optical sheet is attached to the resin frame,
a positioning area of at least one of the first fixing portion and the second fixing portion has a protrusion protruding toward the concavity at the resin frame,
the resin frame has a curved portion at the concavity, the curved portion being formed corresponding to the protrusion, and
the protrusion and the curved portion are engaged.

14. The liquid crystal display apparatus of claim 13, wherein one of the first fixing portion and the second fixing portion without the protrusion at the positioning area is secured at the resin frame with a double-sided tape.

15. The liquid crystal display apparatus of claim 13, wherein the protrusion of the positioning area is an L-shaped protrusion protruding toward the concavity.

16. The liquid crystal display apparatus of claim 13, wherein the protrusion of the positioning area is a T-shaped protrusion protruding toward the concavity, and the curved portion at the concavity is a T-curved portion formed so as to correspond to the protrusion and surround the T-shaped protrusion.

17. The liquid crystal display apparatus of claim 13, further comprising:
a reflection sheet on an opposite side of the light-emitting face relative to the light guide plate,
wherein
a third fixing portion is provided at one side of one of the light guide plate and the reflection sheet, the third fixing portion being fitted into the concavity created at the resin frame to be secured at the resin frame,
a fourth fixing portion is provided at a side opposite the side at which the third fixing portion is provided, the fourth fixing portion being fitted into the concavity created at the resin frame at a part corresponding to the fourth fixing portion so that the light guide plate and the reflection sheet are attached to the resin frame,
a positioning area of at least one of the third fixing portion and the fourth fixing portion has a protrusion protruding toward the concavity at the resin frame,
the resin frame has a curved portion at the concavity, the curved portion being formed corresponding to the protrusion, and
the protrusion and the curved portion are engaged.

* * * * *